Dec. 27, 1966   W. R. TOWER   3,295,129
DIRECTION AND RANGE INDICATOR SYSTEM
Filed Oct. 8, 1952   4 Sheets-Sheet 1

INVENTOR
WALTER R. TOWER
BY
Thomas M. Ferrill, Jr.
ATTORNEY

Dec. 27, 1966  W. R. TOWER  3,295,129
DIRECTION AND RANGE INDICATOR SYSTEM
Filed Oct. 8, 1952  4 Sheets-Sheet 2

INVENTOR
WALTER R. TOWER
BY
Thomas M. Ferrill, Jr.
ATTORNEY

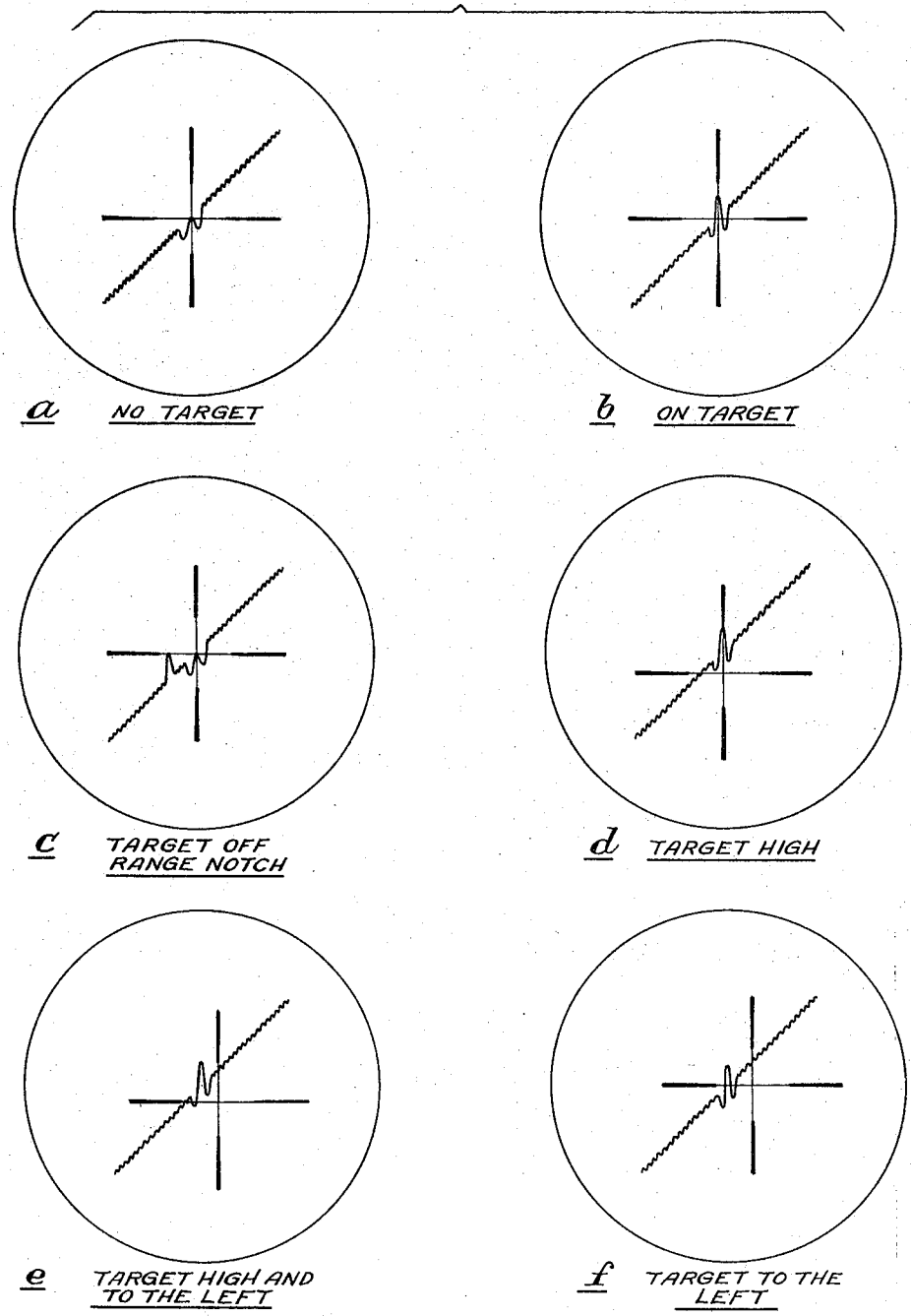

United States Patent Office 3,295,129
Patented Dec. 27, 1966

3,295,129
DIRECTION AND RANGE INDICATOR SYSTEM
Walter R. Tower, Great Neck, N.Y., assignor, by mesne assignments, to the United States of America as represented by the Secretary of the Army
Filed Oct. 8, 1952, Ser. No. 313,703
15 Claims. (Cl. 343—13)

The present invention relates to direction and range indicators and in particular to a radar indicator for simultaneously displaying the direction of a target relative to the directive axis of the radar antenna and the range of the target relative to the range indicated by a range tracking unit.

A primary object of the present invention is to provide a pictorial indicator system for the simultaneous presentation of the azimuth and elevation of a selected target relative to the azimuth and elevation of the average directive axis of a radar scanning antenna and the range of the selected target relative to a reference range marker provided by a range tracking unit.

Another object of the invention is to simultaneously display on a cathode ray tube the azimuth, elevation, and range errors of a selected movable target with respect to a predetermined reference azimuth, elevation, and range for providing a psychologically natural appearance to facilitate the ease with which a single operator may shift the average directive axis of a radar scanning antenna and the time position of a range marker to manually track the movable target.

Yet another object of the invention is to display on the screen of a single cathode ray tube the azimuth and elevation errors of a selected movable target with respect to displayed reference azimuth and elevation coordinate lines wherein the azimuth and elevation error voltages displace the reference azimuth and elevation coordinate lines relative to the displayed representation of the selected target.

Still another object of the present invention is to display on a cathode ray tube the direction and range of a selected movable target relative to a predetermined intersecting coordinate system of axes in a manner which affords the greatest discernible target representation in the presence of undesired jamming interference.

In accordance with the present invention, there is introduced a radar cathode ray tube display system for simultaneously portraying the azimuth, elevation, and range of a selected movable target relative to an intersecting coordinate system of reference lines displayed on the screen of the cathode ray tube. The representation of the selected movable target appears upon a diagonal line traced on the screen of the cathode ray tube by a sweep voltage generator providing an expanded sweep voltage. A reference range marker pulse or notch provided by the radar system and synchronized to the sweep voltage is displayed at the mid-point of the diagonal line. The range of the selected movable target, when it is properly aligned atop the range notch by adjustment of suitable range circuits, is indicated on a range indicator. The azimuth and elevation errors of the selected target are displayed on the screen of the cathode ray tube relative to an intersecting vertical azimuth reference line and a horizontal elevation reference line in the form of a reticle produced by a reticle voltage generator. The displayed azimuth reference line is positioned in azimuth and the displayed elevation reference line is positioned in elevation, respectively, by an azimuth error control voltage and an elevation error control voltage provided by the radar system. The selected target is properly aligned in azimuth and elevation, and the azimuth and elevation errors are zero when the intersection of the reticle coincides with the mid-point of the diagonal line. The diagonal line and the reticle lines are displayed alternately on the screen of the cathode ray tube by switching circuits interposed between the sweep voltage generator and cathode ray tube, and between the reticle voltage generator and cathode ray tube.

The above objects of and the brief introduction to the present invention will be more fully understood and further objects and advantages will become apparent from a careful study of the following detailed description in connection with the drawings, wherein, FIG. 1 illustrates a block diagram of a radar system employing the cathode ray tube display of the present invention;

FIGS. 4a through 4f are several views of the cathode ray tube display illustrating several different possible positions of the target representation relative to a displayed intersecting coordinate system of reference lines.

Figure 1:
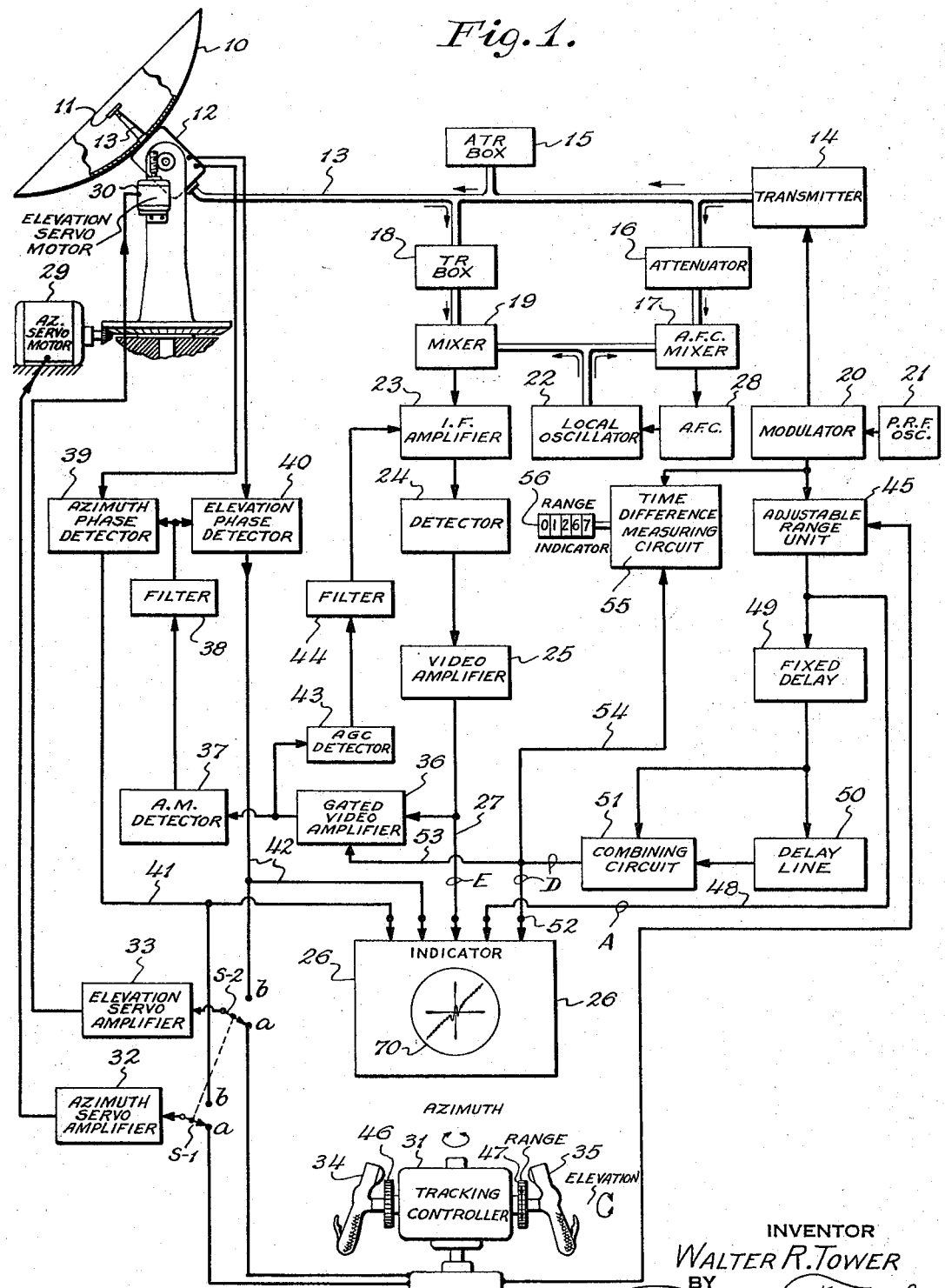

In the several figures of the drawings similar reference numerals refer to similar parts. The illustrated waveforms in FIG. 3 of the voltages associated with the various individual blocks are identified in the block diagrams by capital letters associated with the lead or leads carrying these voltages.

Referring to the block diagram of the radar system disclosed in FIG. 1, a paraboloidal reflector 10 partially surrounds an antenna 11 disposed approximately at the focus of the reflector. The antenna 11 is nutated about the focus of paraboloidal reflector 10 by the nutator drive motor assembly 12. This nutator drive motor assembly 12 may be of the type described in U.S. Patent 2,457,562. The antenna 11 is coupled to wave guide 13 which extends completely through the center of the nutator drive motor assembly 12.

During the transmission cycle of the radar system, pulses of energy are coupled from a conventional radar transmitter 14 over a section of wave guide to the antenna 11 where they are radiated in the direction of an expected target. A portion of this pulse energy is also coupled through attenuator 16 to A.F.C. mixer 17. TR box 18 is located so as to prevent the transmitted energy coupled through the wave guide section from damaging mixer 19. The radar transmitter is periodically keyed by a conventional radar modulator 20 at a pulse repetition frequency determined by the P.R.F. oscillator 21 to produce the pulses of energy.

During the receiving cycle of the radar system, a portion of the electromagnetic energy reflected from a target is collected by reflector 10 and excites antenna 11. This electromagnetic energy is coupled through the wave guide section 13 and through the TR box 18 to the mixer 19 in the conventional manner. The ATR box 15 is located so as to prevent this reflected electromagnetic energy from entering the transmitter 14. The received energy is heterodyned in mixer 19 with energy from local oscillator 22, and energy at the difference frequency between the received signal and the local oscillator output voltage is amplified by I.F. amplifier 23 as in conventional superheterodyne practice. The I.F. amplifier output signal is demodulated by an amplitude modulation detector 24, and the detected output target signal pulses are amplified by video amplifier 25 and supplied over lead 27 to the cathode ray tube indicator 26 of the present invention. The frequency of local oscillator 22 is automatically stabilized by the conventional A.F.C. system of block 28 which may be of the type shown and described in U.S. Patent 2,425,013 to C. C. Stotz.

The average pointing direction of the antenna system, comprising the nutating antenna 11 and the paraboloidal reflector 10, in both azimuth and elevation is under the control of azimuth servo motor 29 and elevation servo motor 30. The azimuth servo motor 29 is energized either by an azimuth control voltage derived from the handle bar tracking controller 31 and coupled through switch S–1a to azimuth servo amplifier 32, or from the azimuth error control voltage on lead 41 from the azimuth phase detector 39 which is coupled through switch S–1b to the azimuth servo amplifier 32. Similarly, the elevation servo motor 30 is energized by either an elevation control voltage derived from the tracking controller 31 and coupled through switch S–2a to elevation servo amplifier 33, or from the elevation error control voltage on lead 42 from the elevation phase detector 40 which is coupled through switch S–2b to the elevation servo amplifier 33. For the manual tracking mode when the ganged switches S–1 and S–2 are in position a, the handle bars 34 and 35 of the tracking controller 31 are manipulated manually by an operator to aim the average pointing direction of the antenna system. The antenna system may be positioned to the left or right in azimuth by positioning the tracking controller 31 counterclockwise or clockwise, respectively, about its vertical axis as shown in FIG. 1. The antenna system may be positioned up or down in elevation by positoning the handle bars 34 and 35 counterclockwise or clockwise, respectively, about their horizontal axis.

The azimuth and elevation of a target relative to the azimuth and elevation of the average pointing direction of the scanning antenna system is determined by comparing the phase of the envelope modulation of the received target reflection signal pulses with a pair of reference phase voltages generated by a two-phase generator contained within the nutator drive motor assembly 12. The target signal pulses on lead 27 are modulated in amplitude at the frequency of nutation of antenna 11 in accordance with the position of the target relative to the average pointing direction of the antenna system. If a target is located at a position to the right of the average pointing direction of the scanning antenna system, the target signal pulses will possess the greatest amplitude when the scanning beam of the antenna system scans to the right of the average pointing direction. These target signals from video amplifier 25 are coupled through gated video amplifier 36 to amplitude modulation detector 37. The gated video amplifier 36 is gated by short, range-gating pulses derived from adjustable range circuits to be described hereinafter. These short, range-gating pulses select a particular target in range from other possible targets at different ranges in order that the azimuth and elevation of only the selected target is determined. These short range-gating pulses are only slightly longer in duration than the target pulses which are to be selected. They are adjustable in range under the control of the adjustable range circuits.

The modulation voltage at the scanning frequency upon the target signal pulses from the selected target is removed by A.M. detector 37 and passed through filter 38 to azimuth and elevation phase detectors 39 and 40. Filter 38 is designed to pass only the demodulated voltage at the nutating frequency. The azimuth reference phase voltage from the two-phase generator in the nutator drive motor assembly 12 is coupled to the azimuth phase detector 39 and the elevation reference phase voltage is coupled to the elevation phase detector 40. Azimuth phase detector 39 compares the phase of the demodulated and filtered voltage from the filter 38 with the azimuth reference phase voltage from the two-phase generator in the nutator drive motor assembly 12 in the same manner as shown and described in U.S. Patent 2,451,632. The output azimuth error control voltage from phase detector 39 is coupled over lead 41 to the indicator circuits 26 of this invention and to the terminal b of switch S–1.

In a similar manner, the elevation phase detector 40 compares the phase of the demodulated and filtered voltage from the filter 38 with the elevation reference phase voltage from the two-phase generator, and the elevation error control output voltage is coupled over lead 42 to the indicator circuits 26 and to the terminal b of switch S–2.

The receiver of the radar system in FIG. 1 is provided with a conventional automatic gain control system including an A.G.C. detector 43 coupled to the output of the gated video amplifier 36 and a filter 44 coupling the A.G.C. detector to I.F. amplifier 23. This type of A.G.C. system is shown and described in U.S. Patent 2,480,842 to N. B. Farnsworth.

The range of a target is measured by an adjustable range unit 45 under the control of the manually operated range tracking wheels 46 and 47 of tracking controller 31. The adjustable range unit 45 produces negative output trigger pulses of waveform A, FIG. 3, of approximately 0.1 microsecond duration at the transmitter pulse repetition frequency. The time position of these output trigger pulses, relative to the modulator trigger or keying pulses, is adjustable over a time interval corresponding to ranges from slightly above zero to the maximum range of the radar system. Either of the range tracking wheels 46 or 47 controls the magnitude of a range error control voltage supplied to the range tracking unit 45 to vary this time delay interval. These negative output trigger pulses are coupled over lead 48 to the indicator circuits 26 and also to fixed delay unit 49.

The fixed delay unit 49, by way of illustration, introduces a time delay of the output trigger pulses from range unit 45 equivalent to approximately 484 yards in range. The delayed trigger pulses from delay unit 49 are applied to a delay line 50 and to a combining circuit 51. The delay line 50 further delays the pulses in time by an amount equivalent to approximately 16 yards in range, approximately one pulse width. Combining circuit 51 adds the two series of delayed pulses to produce the delayed "range notch" pulses of waveform D, FIG. 3. The "range notch" pulses thus comprise a pair of pulses each approximately 16 yards wide with the second pulse following immediately behind the first pulse. The time position midway between the two pulses corresponding to the "notch" of the pair of pulses occurs at a fixed time delay corresponding in range to approximately 500 yards from the output trigger pulses of waveform A. The range notch or range-gating pulses are applied over lead 52 to the indicator 26, over lead 53 to the gated video amplifier 36, and over lead 54 to conventional time difference measuring circuit 55. The range-gating pulses of waveform D gate on the gated video amplifier 36 throughout the duration of the pair of pulses including the "notch" due to the gating characteristics of this amplifier with extremely short gating pulses, so that the "notch" between each of the pulses does not gate off the amplifier.

The conventional time difference measuring circuit 55, which may be of the type shown and described in U.S. Patent 2,478,778, automatically measures the time difference interval between the modulator trigger or keying pulses from modulator 20 and the adjustably delayed range notch pulses from combining circuit 51. This time difference interval is indicated as target range on the range indicator 56.

Figure 2:
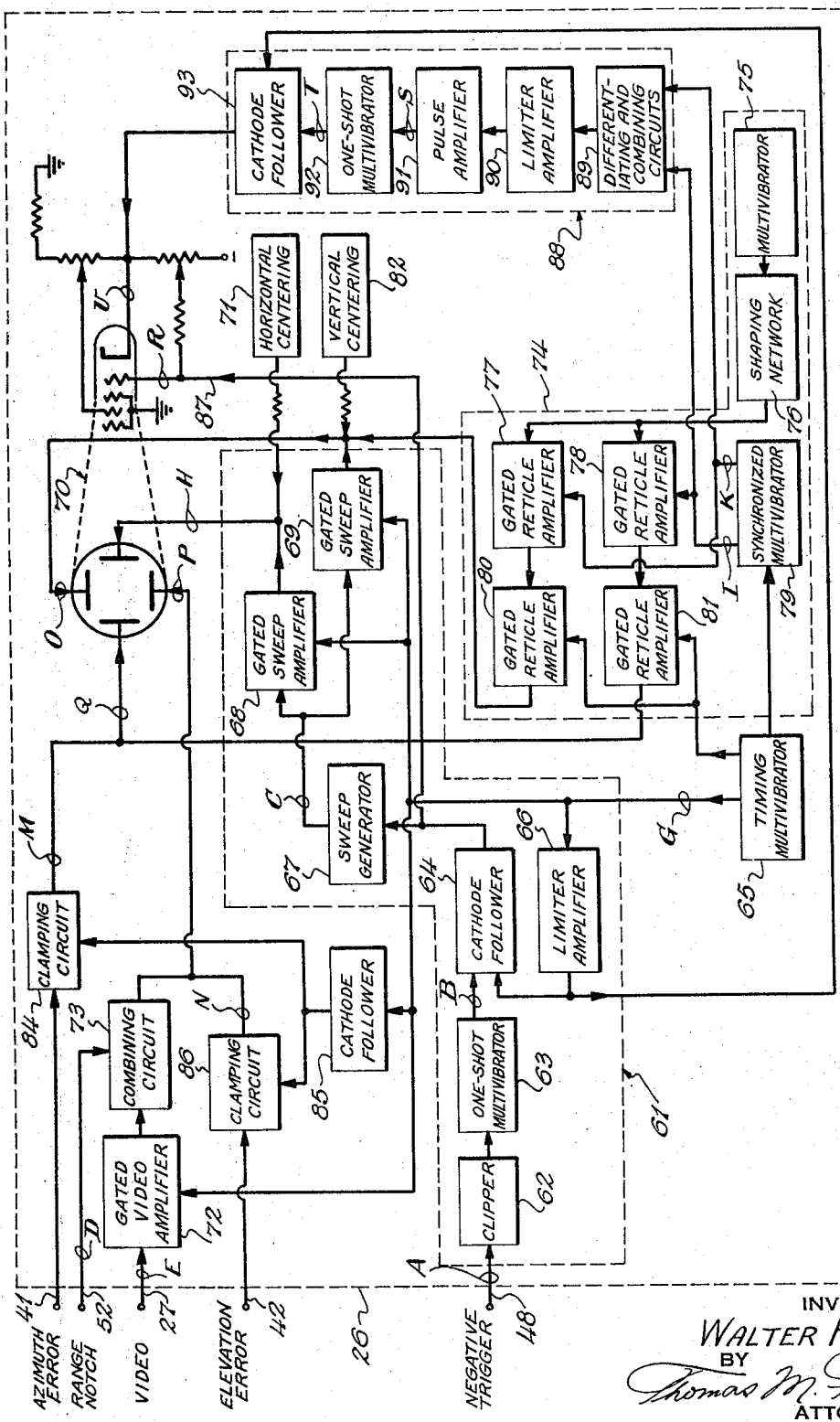
FIG. 2 is a block diagram of the cathode ray tube display system providing the simultaneous presentation of the azimuth, elevation, and range of the selected target relative to a displayed intersecting coordinate system of reference lines.

The cathode ray indicator 26 of this invention simultaneously portrays the azimuth, elevation, and range of a selected target relative to an intersecting coordinate system of reference lines on the screen of a cathode ray tube in a manner now to be described. Referring to FIG. 2, the adjustably delayed negative trigger pulses of waveform A from the adjustable range unit 45 are supplied over lead 48 to the input of a sweep generator system 61 contained within the cathode ray indicator 26. These negative trigger pulses are coupled through a diode clipper 62, to remove any positive excursions, to a one-shot multivibrator 63. The multivibrator is triggered on by these negative pulses and produces a positive output rectangular voltage of waveform B whose time duration is equivalent in range, for example, to approximately 1000 yards. The positive rectangular pulse voltage of waveform B is supplied to a cathode follower 64 which is gated on and off by a square-wave voltage of waveform G derived from a timing multivibrator 65. This square-wave voltage of waveform G, which may have a frequency of 40 cycles per second for example, is further squared and limited by limiter amplifier 66 before gating the cathode follower 64. The 1000 yard rectangular output pulses, gated by the 40 cycle-per-second square wave from cathode follower 64, energize sweep generator 67 to produce the linear sawtooth sweep voltage of waveform C. The sweep portion of the sweep voltage is the "negative going" portion indicated by the fixed time interval $\Delta t$ and is equivalent in range to 1000 yards. This sweep voltage is amplified and switched by two gated sweep amplifiers 68 and 69. These two gated sweep amplifiers are gated simultaneously by the square-wave voltage G from the timing multivibrator 65. The gated sweep voltage from the gated sweep amplifier 68, illustrated as waveform H, is supplied to the right horizontal deflection plate of cathode ray tube 70, and the gated sweep voltage from the gated sweep amplifier 69, of identical waveform, is supplied to the top deflection plate of the cathode ray tube. The sweep voltage portion of waveform H occurring during the sweep time intervals, while illustrated to a longer time scale, is identical to waveform C. For horizontally centering the cathode ray beam, a direct voltage of adjustable magnitude and polarity is also supplied to the right deflection plate through a series resistor from the horizontal centering control unit 71, and the left deflection plate of cathode ray tube 70 is held at ground potential by clamping circuit 84 as will be explained hereinafter.

In operation, the two sweep voltages deflect the electron beam of the cathode ray tube along a diagonal line as illustrated in each of the views of FIG. 4. The sweep trace occurs only during the sweep time intervals that the gated sweep amplifiers 68 and 69 are gated on by the positive half cycles of the 40 cycle-per-second square-wave gating voltage of waveform G from the timing multivibrator 65, and during each of these sweep time intervals a plurality of diagonal sweeps of the cathode ray beam occur.

The target signal pulses of waveform E from video amplifier 25 are applied over lead 27 to a gated video amplifier 72 contained within the cathode ray indicator 26. This gated video amplifier is gated on by the 40 cycle-per-second square-wave voltage from timing multivibrator 65 synchronously with the sweeping of the electron beam diagonally across the screen of the cathode ray tube 70. The gated target pulses are added in the combining circuit 73 to the range notch pulses of waveform D supplied on lead 52, and the composite voltage, target pulses plus range notch pulses, is supplied to the bottom deflection plate of cathode ray tube 70. This composite voltage is displayed on the screen of the cathode ray tube as a deflection oblique to the sweep direction as the cathode ray beam is swept diagonally across the face of the cathode ray tube. In the absence of target signal pulses, the diagonally traced line with range notch appears as illustrated in FIG. 4a.

Figure 3:
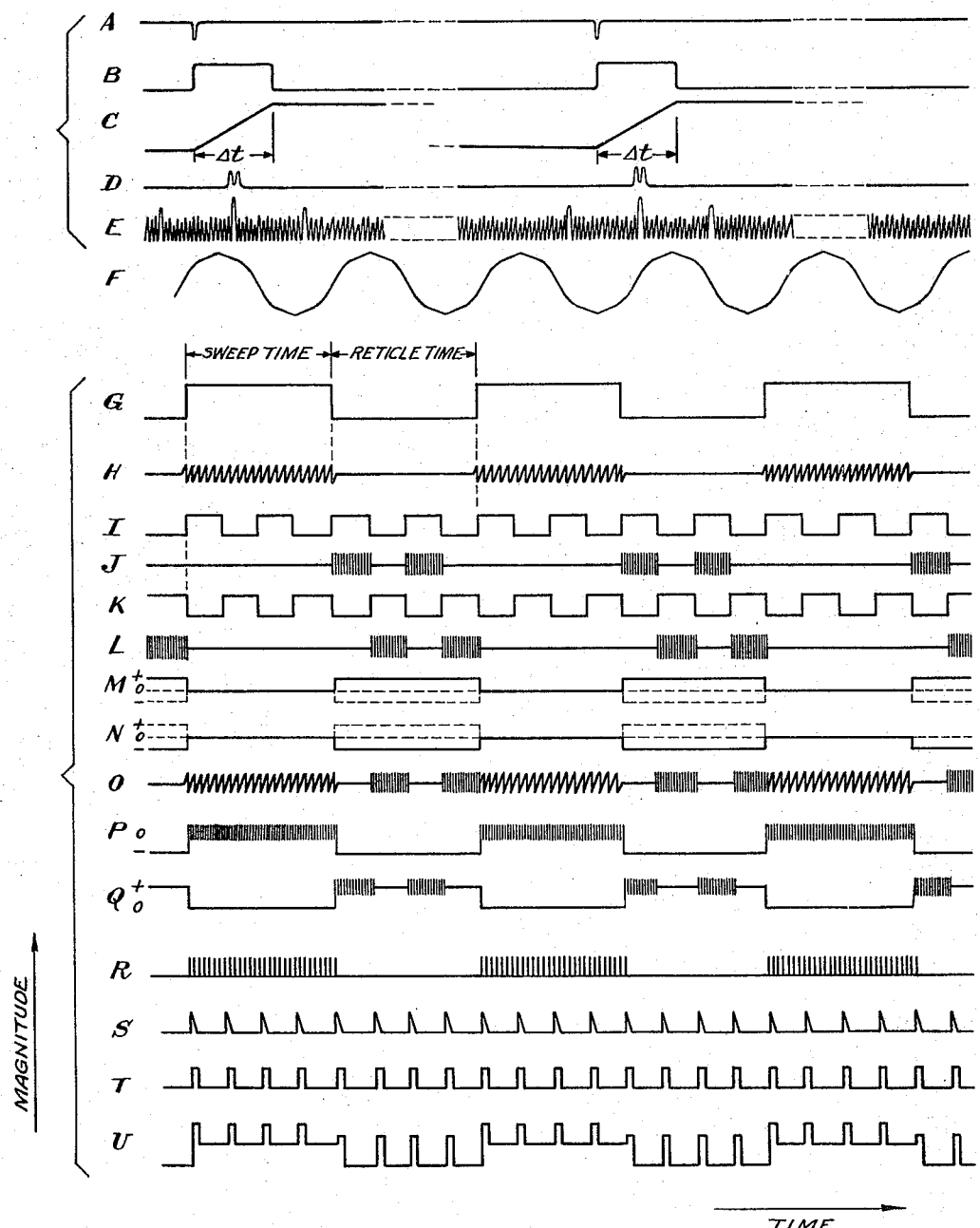
FIG. 3 is an illustration of the waveforms of voltages associated with the block diagrams of FIGS. 1 and 2.

The width of the range notch pulses of waveform D in FIG. 3 as well as in FIGS. 4a through 4f are illustrated as being wider than specified to better show their special wave shape. The voltage waveforms A through E are illustrated to a common time scale different from waveform F and the waveforms G through U.

To indicate the azimuth and elevation errors of a selected target relative to the average pointing direction of the radar antenna system, an intersecting coordinate system of reference lines, similar to a reticle, is displayed on the screen of the cathode ray tube 70. The position of the displayed azimuth reference line is under the control of the azimuth error control voltage, and the position of the displayed elevation reference line is under the control of the elevation error control voltages. These intersecting coordinate lines are produced by the reticle generator circuits 74 on a time sharing basis. A free running multivibrator 75, operating at a frequency, for example, of 16 kilocycles per second, produces a square-wave output voltage that is integrated and shaped by a shaping network 76. The output voltage from the shaping network, which is of triangular waveform, is applied to a first pair of gated reticle amplifiers 77 and 78. These gated reticle amplifiers switch the triangular voltage sequentially, the gated reticle amplifier 77 being energized by a square-wave gating voltage of waveform K from a synchronized multivibrator 79 and the gated reticle amplifier 78 being energized by a square-wave gating voltage of waveform I, of opposite phase, from a second output from the synchronized multivibrator 79. The synchronized multivibrator 79 is synchronized to the 40 cycle-per-second square-wave voltage from timing multivibrator 65 and produces an output voltage at a frequency, for example, of 160 cycles per second.

The output voltage from gated reticle amplifier 77 is applied to another gated reticle amplifier 80 of similar design and the output of gated reticle amplifier 78 is applied to still another gated reticle amplifier 81. These gated reticle amplifiers 80 and 81 are gated simultaneously by the 40 cycle-per-second square-wave voltage from the timing multivibrator 65 and the phase of this square-wave voltage is inverted relative to the phase of the 40 cycle-per-second square-wave voltage of waveform G supplied to gated sweep amplifiers 68 and 69. Thus, the reticle producing voltage is gated sequentially with respect to the sweep voltage on a 50—50 time sharing basis.

In addition to switching or gating the triangular voltage, the gated reticle amplifiers 77, 78, 80, and 81 also partially limit the positive and negative peaks of the triangular wave due to grid current conduction, i.e. saturation. The positive peaks of the wave are partially limited in the first gated amplifiers 77 and 78 while the negative peaks are partially limited in the second gated amplifiers 80 and 81. The resultant output waveform of the 16 kilocycle-per-second limited triangular wave appears as waveform F of FIG. 3. The reason for this special waveform of the reticle producing voltage will be explained hereinafter.

The gated reticle output voltage from reticle amplifier 80, illustrated as a waveform L containing many cycles of the reticle producing voltage within the half cycles of the 160 cycle-per-second switching intervals, is combined with the output voltage of waveform H from gated sweep amplifier 69 and supplied to the top deflection plate of cathode ray tube 70 as a composite voltage of waveform O. In addition to this composite voltage of waveform O, a direct voltage of adjustable magnitude and polarity is supplied to the top deflection plate through a series resistor from the vertical centering control unit 82 for vertically centering the cathode ray beam. The bottom deflection plate is held at ground potential by clamping circuit 86 during the sweep time intervals. The gated output voltage from gated reticle amplifier 81, illustrated as waveform J, is applied to the left deflection plate of cathode ray tube 70.

In operation, the reticle voltage of waveform L applied to the top plate of the cathode ray tube produces a vertical line extending through the center of the screen of the cathode ray tube, and sequentially, the reticle voltage of waveform J applied to the left plate produces a horizontal line through the center of the screen of the cathode ray tube. The sequence of operation of the reticle generator circuits 74 during the reticle time intervals is as follows:

(a) The voltage of waveform J produces a plurality of horizontal sweeps during a first time interval equal to a half cycle of the 160 cycle-per-second square-wave voltage from multivibrator 74. The plurality of horizontal sweeps trace a horizontal line of the screen of the cathode ray tube.

(b) The voltage of waveform L produces a plurality of vertical sweeps during a second time interval of a half cycle of the 160 cycles per second immediately following the first time interval. The plurality of vertical sweeps trace a vertical line on the screen of the cathode ray tube.

(c) The operation as in (a) above is repeated.

(d) The operation as in (b) above is repeated.

The above sequence of operations occurring during the reticle time intervals is equal to a half cycle of the 40 cycle-per-second timing voltage from timing multivibrator 65. During the other half cycle of the 40 cycle-per-second timing voltage referred to as the sweep time interval, a plurality of diagonal sweeps are produced to trace the diagonal line upon the screen of the cathode ray tube.

The horizontal and vertical coordinate lines are perpendicular with respect to each other and always intersect at their mid-points. The special waveform of the reticle producing voltage F producing these lines causes the electron beam of the cathode ray tube to sweep faster through the center of the screen during each sweep than at the ends of the sweep. This action intensifies the coordinate reticle lines at their ends and deintensifies these lines through the center of the cathode ray tube screen as illustrated in each of the FIGS. 4a through 4f, and the operator can view the range notch together with the target pulse without obstruction from the reticle lines.

A sinusoidal voltage waveform could be employed, as an alternative method for producing the reticle lines with the similar result of deintensifying these lines through the center of the cathode ray tube screen. A simple 16 kilocycle-per-second sinusoidal oscillator, replacing multivibrator 75 and the shaping network 76, may be employed to supply a reticle producing voltage to the input of the gated reticle amplifiers 77 and 78. With this alternative arrangement it would not be necessary to employ grid current conduction in the gated reticle amplifiers 77, 78, 80, and 81 to limit the positive and negative peaks of the sinusoidal voltage.

The azimuth error control voltage on lead 41 from the azimuth phase detector 39 is supplied to clamping circuit 84. This clamping circuit may be of the type described on pages 376 and 377 of the book Waveforms published by the McGraw-Hill Book Co., Inc. The clamping circuit 84 is periodically energized by the 40 cycle-per-second square-wave voltage of waveform G coupled through cathode follower 85 from the timing multivibrator 65 with the result that it substantially clamps the azimuth error voltage to ground potential during positive half cycles of this voltage which occur during the sweep time intervals. During the negative half cycles of the 40 cycle-per-second square-wave voltage, the azimuth error voltage is unclamped, and the output voltage from the clamping circuit appears as a voltage of waveform M. This square-wave output error control voltage, which may be either positive, zero, or negative with respect to ground as illustrated in waveform M, is combined with the output voltage of waveform J from gated reticle amplifier 81 to produce the composite voltage of waveform Q which is supplied to the left deflection plate of cathode ray tube 70.

In operation, the output voltage from the clamping circuit 84 does not deflect the electron beam in cathode ray tube 70 during the sweep time intervals as the left deflection plate is held at ground potential, but does position the beam and likewise the vertical coordinate line during the reticle time intervals in accordance with the magnitude and polarity of the azimuth error control voltage. Thus, the position of the vertical coordinate line may be deflected to the left or right by the azimuth error control voltage in accordance with the error between the azimuth of the selected target and the average azimuth pointing direction of the scanning antenna system. As an example, when the azimuth of a selected target is to the left of the average azimuth pointing direction of the scanning antenna system, the azimuth error control voltage positions the vertical coordinate line to the right of the center of the screen of cathode ray tube 70. The diagonal swept line, upon which the target representation appears, remains stationary on the screen of the cathode ray tube at all times and is always swept through the center of the screen. The displayed target representation in the above example thus appears to the left of the vertical azimuth reference line as in FIG. 4f.

In a similar manner, the elevation error voltage on lead 42 is supplied to clamping circuit 86 which is periodically energized by the 40 cycle-per-second square-wave voltage from cathode follower 85. The elevation error control voltage is also clamped to ground potential during positive half cycles of the 40 cycle-per-second square-wave voltage which occur during the sweep time intervals. During the negative half cycles, the elevation error voltage is unclamped and the output voltage from the clamping circuit 86 appears as a voltage of waveform N. This output voltage, which may be either positive, zero, or negative with respect to ground as illustrated in waveform N, is combined with the video signal pulses and the range notch pulses from combining circuit 72 to produce the composite voltage of waveform P which is supplied to the bottom deflection plate of cathode ray tube 70.

The elevation error control voltage of waveform N does not deflect the electron beam of cathode ray tube 70 during the sweep time intervals, but positions the horizontal coordinate line during the reticle time intervals in accordance with the magnitude and polarity of the elevation error control voltage. The position of the horizontal coordinate line may be deflected up or down by the elevation error control voltage in accordance with the error between the elevation of the selected target and the average elevation pointing direction of the scanning antenna system. For example, when the elevation of a selected target is above the average elevation pointing direction of the scanning antenna system, the elevation error control voltage positions the horizontal coordinate line downward from the center of the screen of cathode ray tube 70. The displayed target representation thus appears above the horizontal elevation reference line as in FIG. 4d.

When either the azimuth reference line is displaced by the azimuth error control voltage or the elevation reference line is displaced by the elevation error control voltage, the coordinate reference lines move together as illustrated in FIGS. 4d, 4e, and 4f, thereby maintaining a reticle.

The electron beam of cathode ray tube 70 is blanked during the return trace of the diagonal sweep, and also for a portion of the time of each of the switching intervals of the 160 cycle-per-second reticle switching voltage. This insures uniform intensity in the presentation of the diagonal sweep trace and the vertical and horizontal coordinate reference lines. The gated 1000 yard positive pulses from cathode follower 64, which energizes the sweep generator 67 to produce the linear sweep voltage are also applied over lead 87 to the control or intensity grid of cathode ray tube 70. These positive gated 1000 yard pulses, illustrated as waveform R, turn on the electron beam of cathode ray tube 70 during the linear sweep voltage intervals Δt, the electron beam being off during the longer time intervals between these sweeps. The return of the electron beam during the longer time intervals is thus prevented from tracing a high intensity diagonal line on the face of the cathode ray tube. The intensity grid, focussing grid, and cathode of cathode ray tube 70 are supplied with suitable direct voltages, in the conventional manner, by the resistor voltage dividers coupled to a source of negative potential as shown in FIG. 2.

During the switching of the gated sweep amplifiers 68 and 69 and the gated reticle amplifiers 77, 78, 80, and 81 by the 40 cycle-per-second and the 160 cycle-per-second square-wave voltages, undesired transients are introduced into the outputs of these circuits at the switching discontinuities. These transients, which are not shown in the waveforms of the voltages H, O, P, or Q, would cause irregularities in the intensity of the traced lines appearing on the screen of the cathode ray tube and extraneous beam deflections if some means were not employed to remove them. The cathode ray beam blanking circuits of block 88 are employed to turn off the electron beam in cathode ray tube 70 during the occurrence of these transients to prevent their delineation upon the screen of the tube.

In the blanking circuits of block 88, the 160 cycle-per-second square-wave voltages of waveforms I and K from synchronized multivibrator 79 are applied to the input of the differentiating and combining circuits 89 which produce short positive pulses at each switching discontinuity of the 160 cycle-per-second square-wave voltages. These short positive pulses with a pulse repetition frequency of 320 cycles per second are coupled through limiter amplifier 90, to remove any negative excursions, to pulse amplifier 91. The amplified pulses from pulse amplifier 91, illustrated as waveform S, are applied to a one-shot multivibrator 92 which produces a positive output pulse voltage illustrated as waveform T. These positive output pulses of waveform T, which have a pulse duration of approximately one-fourth cycle, are combined in the cathode follower 93 with the 40 cycle-per-second square-wave voltage from limiter amplifier 66. The composite output voltage from cathode follower 93, illustrated as waveform U, is applied to the cathode of cathode ray tube 70.

Positive pulses on the cathode of the cathode ray tube turn off the electron beam while a negative potential turns on the electron beam. Thus, the 320 cycle-per-second positive pulses of waveform U blank the cathode ray beam to prevent the delineation of the transient voltages, and the negative portion of this wave occurring during the reticle time, increases the intensity of the cathode ray trace. The reason for this increase in intensity of the cathode ray trace during the reticle time can be understood by observing the waveform of the voltage R which is applied to the control grid of the cathode ray tube. During the sweep time the cathode ray beam is turned on by the short gated positive pulses R but during the reticle time, there exists no voltage on the grid of the cathode ray tube to keep the beam turned on. Accordingly, the negative portion of waveform U occurring during the reticle time turns on or intensifies the cathode ray trace to a suitable intensity level during the tracing of the reticle.

The cathode ray indicator circuits of this invention employed in the radar tracking system of FIG. 1 enable a single operator to manually track a selected target in azimuth, elevation, and range. In the absence of a target within plus or minus 500 yards of the manually adjustable tracking point of the range notch, the cathode ray tube presentation appears as in FIG. 4a. The diagonal line is traced by the 1000 yard sweep voltage, sweeping from the upper right hand corner on the screen of the tube downward to the lower left hand corner. The sweep voltage is linear on both the forward sweep as well as the return sweep so that the mid-point of the forward sweep remains fixed at the center of the screen of the cathode ray tube. The diagonal traced line remains stationary on the tube at all times as mentioned heretofore. The range notch appearing in the form of a W remains fixed at the mid-point of the diagonal line. The center peak of the W denotes the tracking point, and the reticle intersects at this peak when properly aligned in azimuth and elevation.

A target to be tracked is first selected from other targets by means of a conventional radar search indicator external to the present invention. The operator sets the ganged switches S–1 and S–2 to position a, and manipulates the handle bar controls 34 or 35 to aim the average pointing direction of the antenna system of the radar system of FIG. 1 in the direction of the selected target. It is convenient to visualize the point of intersection of the reticle as representing the average pointing direction of the antenna system. The range tracking wheel 46 or 47 is rotated by the operator to move the range tracking gate or point in range until the selected target appears upon the diagonally traced line. While the range tracking gate or notch is moving towards the target, the representation of the tracking gate appearing at the mid-point of the diagonal line does not move. Instead, the target representation moves along the diagonal line relative to the tracking notch. This type of presentation exists because the sweep voltage is in synchronism with the range-gating pulses. As a result, when the range-gating pulses are advanced or delayed in time in order to scan in range, the sweep voltage is advanced or delayed in synchronism with these pulses. Therefore, an operator viewing the presentation observes the target representation as moving, whereas it is the range-gating pulse that actually moves in range towards the selected target.

It is important to note that by arranging the diagonal line to sweep from the upper right hand corner of the face of the cathode ray tube to the lower left hand corner, that the selected target is actually closer to the radar when it appears in the first quadrant than when it appears in the third quadrant. Yet, as viewed by the operator, the target first appears in the third quadrant when the radar ranging system is scanning out in range in search of the target. Psychologically, the operator views the target as moving along the diagonal line and places the target atop the stationary range notch at the mid-point of the diagonal line. When the selected target appears in the third quadrant, the operator senses that he should position the range tracking wheel 46 or 47 to move the target out in range, and by rotating the range wheel upward, the target representation moves toward the tracking point.

When the selected target is properly aligned in azimuth, elevation, and range, it appears atop the range notch as in FIG. 4b. When the target is displaced off the range notch as in FIG. 4c, there are no azimuth and elevation output error control voltages from the azimuth phase detector 39 and the elevation phase detector 40. The reason for this may be understood by referring to the overall system of FIG. 1. The azimuth and elevation phase detectors 39 and 40 receive the target pulses from the gated video amplifier 36 which is gated on by the range gate pulses on lead 53. Unless the selected target pulses are coincident with the range-gating pulses, which means that the target must be positioned atop the range notch as in FIG. 4b, the gated video amplifier 36 will not pass the selected target pulses to the phase detectors 39 and 40. This insures that the phase detectors 39 and 40 will only supply azimuth and elevation error control voltages of a selected target when the selected target is within the range gate.

If a selected target is properly located atop the range notch, and the target is above the average pointing direction of the radar antenna system, the indicator display appears as in FIG. 4d. If the target is both above and to the left of the average pointing direction of the antenna system, and the target is properly located atop the range notch, then the indicator display appears as in FIG. 4e. Finally, if the selected target is to the left of the average pointing direction, the indicator display appears as in FIG. 4f. Thus, the indicator system displays the range, azimuth, and elevation errors of the selected target relative to the tracking point and the reticle lines. When the selected target is atop the range notch, the target range is correctly indicated on range indicator 56.

To assist the operator in tracking a selected movable target, the ganged switches S-1 and S-2 may be set to position b and the azimuth and elevation error control voltages may be used to automatically position the azimuth and elevation servo motors without the necessity of manipulating the handle bars 34 and 35.

The display of a selected movable target representation along a stationary diagonal line with the azimuth and elevation position of the target representation being referred to a coordinate system of reference lines greatly assists an operator in maintaining the target representation properly aligned in range, azimuth, and elevation in the presence of undesired jamming interference. This improvement exists because the target representation appears along a diagonal line that remains stationary, and the operator can focus his eyes upon the target representation in the presence of the jamming signal and easily correct for azimuth and elevation errors by bringing the point of intersection of the vertical and horizontal reference lines into coincidence with the target representation without having to optically track or focus his eyes on the moving reference lines.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pictorial indicator system for providing a unitary indication of the direction of an object in space from a reference station and the range to said object in space from a predetermined reference location in space, said predetermined reference location in space lying on a line extending from said reference station through said object in space, comprising in combination, means for establishing a visible coordinate system of reference lines, said coordinate system of reference lines including an azimuth reference line, an elevation reference line substantially orthogonal to and intersecting said azimuth reference line, and a stationary line oblique to said azimuth and elevation reference lines, means for denoting a reference point on said stationary oblique reference line, the reference point on said stationary oblique reference line representing said predetermined reference location in space, means for varying said azimuth reference line relative to the reference point on said stationary oblique reference line in accordance with the azimuth of said object in space relative to an azimuth reference plane extending outward from said reference station, means for varying said elevation reference line relative to the reference point on said stationary oblique reference line in accordance with the elevation angle of said object in space relative to an elevation reference plane extending outward from said reference station, means providing a representation of said object in space on said stationary oblique reference line, and means for displacing the representation of said object along said stationary oblique reference line relative to said reference point according to changes in range between said object in space and said predetermined reference location.

2. A pictorial indicator system for providing an indication of the direction and range of an object in space from a reference station, comprising in combination, means for establishing a visible coordinate system of reference lines, said coordinate system of reference lines including an azimuth reference line, an elevation reference line substantially orthogonal to and intersecting said azimuth reference line, and a stationary reference line oblique to said azimuth and elevation reference lines, means for denoting a reference point on said stationary oblique reference line, means for varying the position of said azimuth reference line relative to the reference point on said stationary oblique reference line in accordance with the azimuth of said object in space relative to an azimuth reference plane extending outward from said reference station, means for varying the position of said elevation reference line relative to the reference point on said stationary oblique reference line in accordance with the elevation angle of said object in space relative to an elevation reference plane extending outward from said reference station, means providing a representation of said object in space on said stationary oblique reference line, the position of the representation of said object along said stationary oblique reference line varying according to the range between said reference station and said object in space, and range measuring apparatus including a range indicating means for measuring the range between said reference station and said object in space, said range measuring apparatus further including means for varying the position of the representation of said object along said stationary oblique reference line and varying the range indicated by said range indicating means, whereby said range indicating means indicates the range to said object in space when the representation of said object along said stationary oblique reference line is coincident with the reference point on said stationary oblique reference line.

3. A pictorial indicator system for providing a unitary indication of the direction of an object in space from a reference station and the range to said object in space from a predetermined reference location in space, said predetermined reference location in space lying on a line extending from said reference station through said object in space, comprising in combination, means including a cathode ray oscilloscope for displaying a visible coordinate system of reference lines on the screen of the cathode ray tube therein, said coordinate system of reference lines including an azimuth reference line, an elevation reference line substantially orthogonal to and intersecting said azimuth reference line, and a stationary reference line oblique to said azimuth and elevation reference lines, means for denoting a reference point on said stationary oblique reference line, the reference point on said stationary oblique reference line representing said predetermined reference location in space, means for varying the position of said azimuth reference line relative to the reference point on said stationary oblique reference line in accordance with the azimuth of said object in space relative to an azimuth reference plane extending outward from said reference station, means for varying the position of said elevation reference line relative to the reference point on said stationary oblique reference line in accordance with the elevation angle of said object in space relative to an elevation reference plane extending outward from said reference station, means providing a representation of said object in space on said stationary oblique reference line, and means for displacing the representation of said object along said stationary oblique reference line relative to said reference point according to changes in the range of said object in space relative to said predetermined reference location.

4. The pictorial indicator system as defined in claim 3 wherein said means including said cathode ray oscilloscope for displaying a visible coordinate system of reference lines on the screen of the cathode ray tube therein includes means for sequentially tracing said azimuth reference line, said elevation reference line, and said stationary oblique reference line on said cathode ray oscilloscope screen.

5. The pictorial indicator system as defined in claim 3 wherein said means for denoting a reference point on said stationary oblique reference line includes a deflection means for momentarily deflecting the cathode ray beam of said oscilloscope for producing a deflection of the cathode ray trace away from said stationary oblique reference line.

6. In a radar system including directive antenna means radiating electromagnetic energy pulses in the direction of an expected target and collecting a portion of the electromagnetic energy pulses reflected therefrom, said radar system further including means providing an output target signal voltage from the collected energy pulses reflected from a target, means providing an output representing the azimuth of a target relative to the azimuth pointing direction of said directive antenna, and means providing an output representing the elevation of a target relative to the elevation pointing direction of said directive antenna; a radar indicator system, comprising a cathode ray oscilloscope, means included in said cathode ray oscilloscope for displaying a visible coordinate system of reference lines on the screen of the cathode ray tube therein, said coordinate system of reference lines including an azimuth reference line, an elevation reference line substantially orthogonal to and intersecting said azimuth reference line, and a stationary reference line oblique to said azimuth and elevation reference lines, means supplying said output target signal voltage from said radar system to said cathode ray oscilloscope for producing a target representation on said stationary oblique reference line, means supplying said output representing the azimuth of a target relative to the azimuth pointing direction of said directive antenna to said cathode ray oscilloscope for positioning said azimuth reference line, and means supplying said output representing the elevation of a target relative to the elevation pointing direction of said directive antenna to said cathode ray oscilloscope for positioning said elevation reference line.

7. The apparatus as defined in claim 6 wherein said radar system further includes means for providing output range marker pulses and means supplying said range marker pulses to said cathode ray oscilloscope for denoting a reference point on said stationary oblique reference line.

8. A pulse radar indicator system comprising a cathode ray oscilloscope, first sweep means for alternately sweeping the beam of said oscilloscope through first and second mutually perpendicular linear traces, second sweep means for recurrently sweeping the beam of said oscilloscope through a further trace diagonally intersecting said first and second linear traces at the radar pulse frequency, means for producing a range index on said further trace, means for introducing a received signal modulation on said further trace, and means for alternately coupling said oscilloscope to said first sweep means and to said second sweep means, said range index producing means, and said received signal modulation introducing means.

9. A pulse radar indicator system comprising a cathode ray oscilloscope, first sweep means for alternately sweeping the beam of said oscilloscope through a vertical linear trace and a horizontal linear trace, second sweep means for recurrently sweeping the beam of said oscilloscope through a diagonal trace at the radar pulse frequency, means operative during the sweeping of said diagonal trace for producing a first momentary deflection of said beam from said diagonal trace at a point thereon varying according to target range, and for producing a further demarcation in said diagonal trace as a range index thereon, and means coupled to said oscilloscope for alternately switching said first sweep means and said second sweep means into operative connection thereto.

10. The pulse radar indicator system as defined in claim 9 wherein said cathode ray oscilloscope includes a cathode ray tube having a pair of vertical deflection plates and a pair of horizontal deflection plates, said first sweep means including means for alternately supplying a sweeping voltage to said vertical deflection plates and to said horizontal deflection plates, and said second sweep means including means for simultaneously supplying a first voltage to said vertical deflection plates and a second cophasal voltage to said horizontal deflection plates.

11. The pulse radar indicator system as defined in claim 10 wherein said means operative during the sweeping of said diagonal trace for producing a first momentary deflection of said beam and for producing a further demarcation in said diagonal trace as a range index thereon includes means coupled to said vertical deflection plates of said cathode ray tube for supplying momentary deflection pulses and range index pulses thereto.

12. The pulse radar indicator system as defined in claim 9 further including means coupled to said cathode ray oscilloscope during the sweeping of said vertical and horizontal linear traces for adjusting the position of said vertical linear trace and the position of said horizontal linear trace.

13. In a radar tracking system including directive antenna means radiating electromagnetic energy pulses in the direction of an expected target and collecting a portion of the electromagnetic energy pulses reflected therefrom, said radar tracking system further including means for orienting the direction of said directive antenna means in azimuth and elevation, means for providing an output azimuth error control voltage varying according to the azimuth of a target relative to the azimuth pointing direction of said directive antenna means, means for providing an output elevation error control voltage varying according to the elevation angle of a target relative to the elevation pointing direction of said directive antenna means, means for providing an output synchronizing pulse voltage synchronized with and delayed from the pulses of electromagnetic energy radiated from said antenna means, means for providing an output range marker pulse voltage synchronized with and delayed from said output synchronizing pulse voltage, and means for providing an output target signal voltage from the collected energy pulses reflected from a target; a cathode ray indicator system comprising: a cathode ray tube, an alternating voltage producing means, a first switching means coupling said alternating voltage producing means to said cathode ray tube, a timing oscillator means coupled to said first switching means for energizing said switching means during a first time interval, said first switching means coupling said alternating voltage producing means to said cathode ray tube for alternately tracing a horizontal line and a vertical line on the screen of said cathode ray tube during said first time interval, means adapted for coupling said azimuth error control voltage to said cathode ray tube during said first time interval for adjusting the position of said vertically traced line, means adapted for coupling said elevation error control voltage to said cathode ray tube during said first time interval for adjusting the position of said horizontally traced line, a sweep voltage generator means, means adapted for coupling said synchronizing pulse voltage to said sweep voltage generator means, a second switching means coupling said sweep voltage generator means to said cathode ray tube, means coupling said timing oscillator means to said second switching means for energizing said second switching means during a second time interval different from said first time interval, said second switching means coupling said sweep voltage generator means to said cathode ray tube for tracing a diagonal line upon the screen of said cathode ray tube during said second time interval, means adapted for coupling said range marker pulse voltage to said cathode ray tube during said second time interval for displaying a range mark upon said diagonal line, and means adapted for coupling said target signal voltage to said cathode ray tube during said second time interval for displaying a target representation upon said diagonal line.

14. In a radar tracking system including directive antenna means radiating electromagnetic energy pulses in the direction of an expected target and collecting a portion of the electromagnetic energy pulses reflected therefrom, said radar tracking system further including means for orienting the direction of said directive antenna means in azimuth and elevation, means for providing an output synchronizing pulse voltage synchronized with the pulses of electromagnetic energy radiated from said antenna means, means for providing an output target signal voltage from the collected energy pulses reflected from a target, means for providing an output azimuth error control voltage varying according to the azimuth of a target relative to the azimuth pointing direction of said directive antenna means, and means for providing an output elevation error control voltage varying according to the elevation angle of a target relative to the elevation pointing direction of said directive antenna means; a radar tracking indicator system comprising: a cathode ray tube having a pair of horizontal deflection plates and a pair of vertical deflection plates, a sweep voltage generator means, means adapted for coupling said synchronizing pulse voltage from said radar tracking system to said sweep voltage generator means, said sweep voltage generator means producing an alternating sweep voltage synchronized with said synchronizing pulse voltage, switching means coupling said sweep voltage generator means to at least one of the horizontal deflection plates and to at least one of the vertical deflection plates of said cathode ray tube, a timing oscillator means coupled to said switching means for energizing said switching means during a first time interval, said switching means coupling said alternating sweep voltage to said horizontal deflection plate and said vertical deflection plate for tracing a diagonal line upon the screen of said cathode ray tube during said first time interval, means adapted for coupling said target signal voltage from said radar tracking system to one of the vertical deflection plates of said cathode ray tube during said first time interval for producing a target representation on the screen of said cathode ray tube as an oblique deflection from said diagonally traced line, a reticle voltage producing means, said reticle voltage producing means comprising means supplying an alternating voltage and means responsive thereto for alternately applying said alternating voltage to at least one of said vertical deflection plates and to at least one of said horizontal deflection plates during a second time interval different from said first time interval, the alternating output voltage from said reticle voltage producing means alternately tracing a horizontal line and a vertical line on the screen of said cathode ray tube during said second time interval, means adapted for coupling said azimuth error control voltage from said radar tracking system to at least one of the horizontal deflection plates of said cathode ray tube during said second time interval for adjusting the position of said vertically traced line, and means adapted for coupling said elevation error control voltage from said radar tracking system to at least one of the vertical deflection plates of said cathode ray tube during said second time interval for adjusting the position of said horizontally traced line.

15. A radar indicator system comprising, a cathode ray tube having a pair of vertical deflection plates and a pair of horizontal deflection plates, a triggered sweep voltage generator means, input circuit means coupled to said triggered sweep voltage generator means and adapted for receiving an external trigger pulse voltage, said triggered sweep voltage generator means producing an output alternating sweep voltage, first switching means coupling said sweep voltage generator means to at least one of the horizontal deflection plates and to at least one of the vertical deflection plates of said cathode ray tube, a timing oscillator means coupled to said switching means for energizing said switching means during a first time interval, said first switching means coupling said alternating sweep voltage from said sweep voltage generator means to said horizontal deflection plate and to said vertical deflection plate for tracing a diagonal line upon the screen of said cathode ray tube during said first time interval, second switching means coupled to one of the vertical deflection plates of said cathode ray tube, means coupling said timing oscillator to said second switching means for energizing said second switching means during said first time interval, input circuit means coupled to said second switching means and adapted for receiving an external pulse voltage, said second switching means coupling the applied pulse voltage at its input circuit to said vertical deflection plate during said first time interval for producing a representation of said voltage as an oblique deflection from said diagonally traced line, means for alternately producing a horizontal line and a vertical line on the screen of said cathode ray tube in the form of a reticle, said line producing means comprising means producing a first and second alternating voltage, a third switching means responsive to said first and second alternating voltage for applying said first alternating voltage to at least one of said vertical deflection plates and for applying said second alternating voltage to at least one of said horizontal deflection plates, means coupling said timing oscillator to said third switching means for energizing said third switching means during a second time interval different from said first time interval, said first and second alternating output voltages from said line producing means tracing a vertical line and a horizontal line, respectively, on the screen of said cathode ray tube during said second time interval, a fourth switching means coupled to at least one of the horizontal deflection plates, said fourth switching means including an input circuit adapted for receiving a first external direct control voltage, a fifth switching means coupled to at least one of the vertical deflection plates, said fifth switching means including an input circuit adapted for receiving a second external direct control voltage, and means coupling said timing oscillator means to said fourth and fifth switching means for energizing said fourth and fifth switching means, said fourth switching means coupling the voltage in its input circuit to said horizontal deflection plate and said fifth switching means coupling the voltage in its input circuit to said vertical deflection plate during said second time interval.

References Cited by the Examiner
UNITED STATES PATENTS

| | | | |
|---|---|---|---|
| 2,467,319 | 4/1949 | King | 343—11 |
| 2,516,765 | 7/1950 | Ferrell | 343—7.4 |

LEWIS H. MYERS, *Primary Examiner.*

NORMAN T. EVANS, *Examiner.*

A. K. GEER, R. D. BENNETT, *Assistant Examiners.*